May 31, 1949.  C. D. DOSKER  2,472,006
ADJUSTABLE JIG FOR MANUFACTURING LAMINATED TIMBERS
Filed July 15, 1944  4 Sheets-Sheet 1

INVENTOR.
CORNELIUS D. DOSKER

BY Arthur H. Robert
Atty.

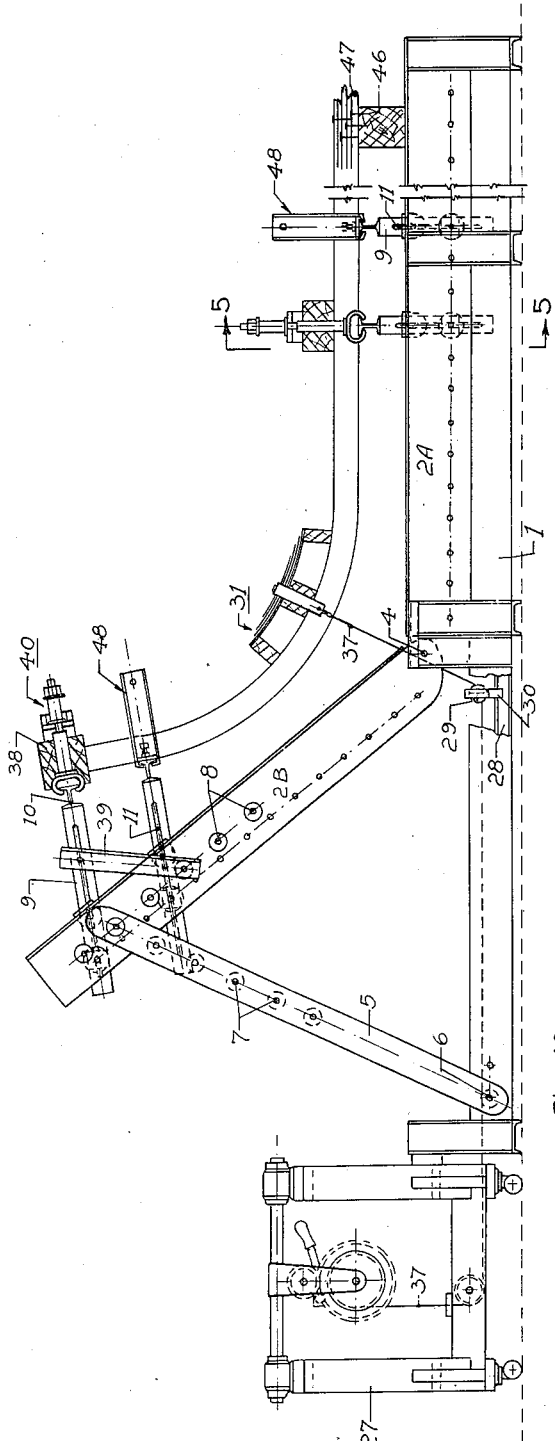

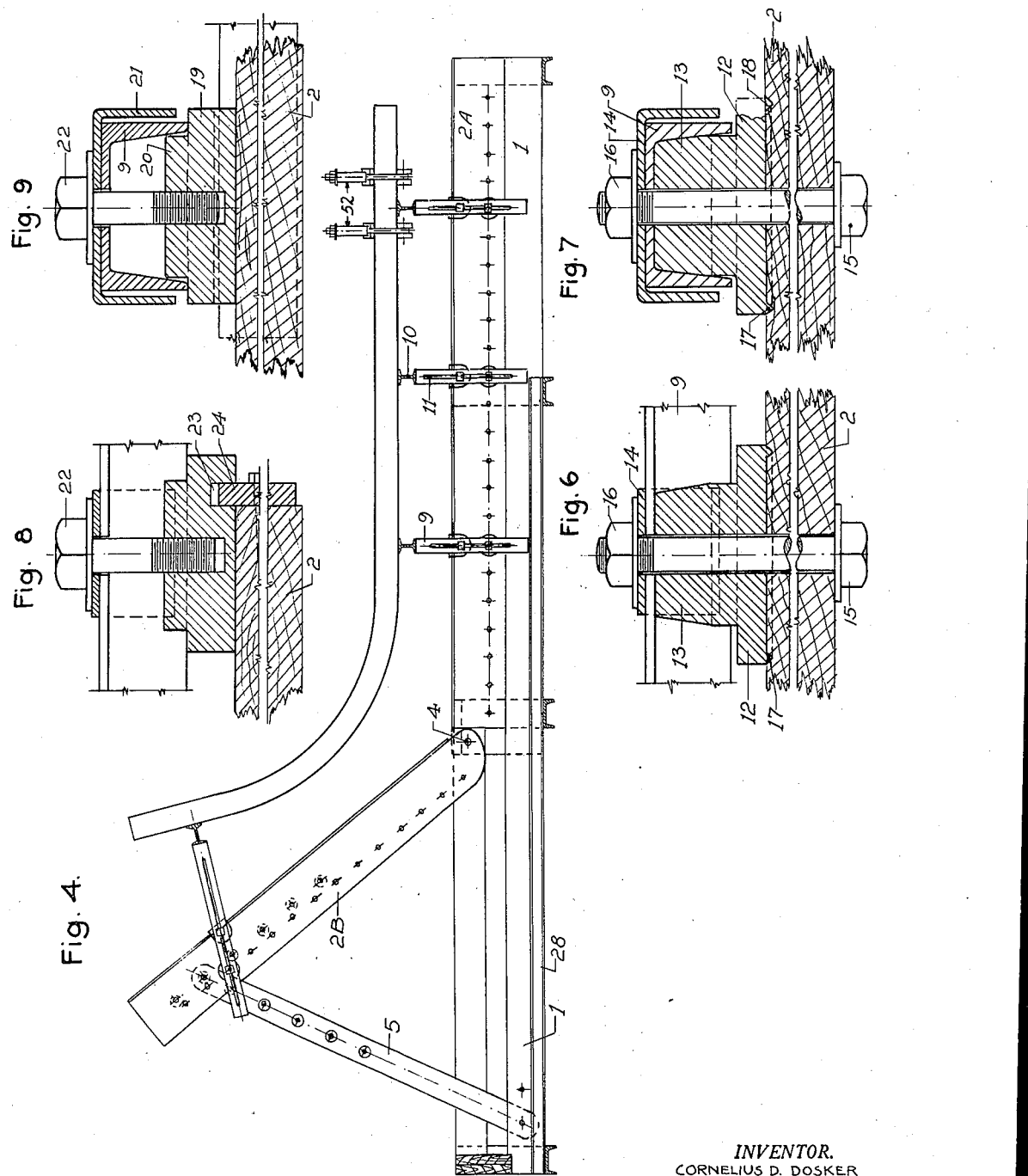

May 31, 1949.   C. D. DOSKER   2,472,006
ADJUSTABLE JIG FOR MANUFACTURING LAMINATED TIMBERS
Filed July 15, 1944   4 Sheets-Sheet 4

INVENTOR.
CORNELIUS D. DOSKER
BY Arthur H. Robert
Atty

Patented May 31, 1949

2,472,006

UNITED STATES PATENT OFFICE 2,472,006

ADJUSTABLE JIG FOR MANUFACTURING LAMINATED TIMBERS

Cornelius D. Dosker, Louisville, Ky., assignor to Gamble Brothers, Louisville, Ky., a corporation of Kentucky Application July 15, 1944, Serial No. 545,160

16 Claims. (Cl. 144—259)

1

It has heretofore been proposed to manufacture curved laminated timbers for use as boat keels, boat ribs, building beams, etc., by superimposing glue-coated lumber laminations one over the other, bending them over a form to a desired curvature and then clamping them firmly together to hold them in their bent shape until they are bonded into a unitary beam by the curing or setting of the glue. In such manufacture, it is desirable that the forms or jigs, over which the laminations are bent, be adjustable to different curvatures and be capable of handling beams varying widely in length, width and thickness. While various jigs have heretofore been proposed, none of them meet these requirements in a highly satisfactory manner. The present invention relates to an adjustable jig, which is particularly suited for use in the manufacture of both straight and curved laminated timbers.

The principal object of the invention is to provide a novel and highly practical form of adjustable jig which can be easily and quickly adjusted to form any of a variety of platforms ranging from straight to simple, compound and reverse curvatures, and which is capable of handling straight and curved timbers or beams varying widely in length, width and thickness.

Another object is to provide an adjustable jig, the construction of which facilitates the beam manufacturing process, the use of mechanical means for bending the lumber to conform to the jig platform whenever such means is necessary; and the use of clamping means for clamping the lumber, not only to the jig members, to secure close conformance to the curvature of the platform provided by them, but also independently of such platform, to permit the removal of the clamped lumber from the jig so that it may be cured elsewhere.

A further object is to provide a novel method of fabricating a laminated timber.

A jig, constructed in accordance with this invention, comprises: a longitudinal base; and a series of jig members spaced along the length of the base and vertically arranged to present a series of spaced upwardly-facing jig surfaces, each jig member being adjustably mounted so that its jig surface can be raised or lowered and moved forward or backward to a particular position in which it cooperates with the jig surfaces of other adjusted jig members to form a longitudinally-extending lumber-receiving platform having the curvature sought in the beam. The invention contemplates the use, in combination with the jig, not only of mechanical means which

2 can be arranged to extend outwardly, between any pair of jig members, into engagement with the lumber for purpose of mechanically bending it to conform to the platform curvature, but also of a series of platform clamps for clamping the lumber directly to each jig member in the platform and of a series of independent clamps for clamping the lumber between the platform clamps.

With the proposed arrangement, it is a simple matter to adjust the jig members to form a rigid platform of desired slope; to place the superimposed glue-coated lumber laminations over the platform; bend the laminations mechanically or manually against and clamp them to the platform; and to clamp them independently of the platform, release the platform clamps and remove the lumber with the independent clamps to a curing room or oven wherein they are bonded into a unitary beam by the curing or setting of the glue.

An adjusted jig embodying the invention is illustrated in the accompanying drawings wherein:

Fig. 3 is a partly broken side elevation with part of the base inclined, with the jig members adjusted to form a platform having a simple curvature, with the lumber laminations arranged between guides and mechanically bent to the curvature of the platform, and with one platform clamp in clamping position, the lumber being blocked at both ends;

Fig. 4 is a longitudinal sectional view taken vertically thru Fig. 3 with lumber laminations held in place by independent clamps, most of which are omitted for the sake of clearness;

Figs. 6 and 7 are vertical and horizontal sectional views taken centrally thru a lower jig member clamping means;

Figs. 8 and 9 are vertical and horizontal sectional views taken centrally thru an upper jig member clamping means;

Figures 10, 11 and 12 are details of the mechanical bending or winch apparatus;

Base (1–8)

Figure 2:
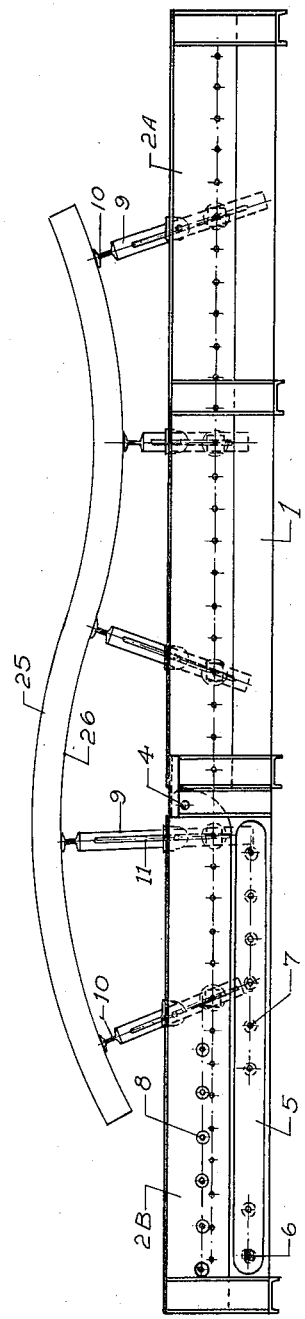
Fig. 2 is a side elevation of the Fig. 1 structure with the base entirely horizontal and the jig members adjusted to a template to form a platform having a reverse curvature.
Figure 1:
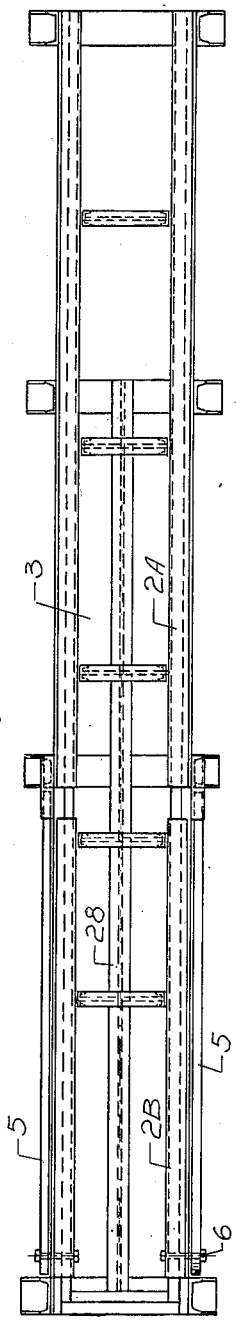
Fig. 1 is a top plan view with the base entirely horizontal.

The base which preferably contains a longitudinal upwardly-open channel underlying a work space, comprises: a rigid, longitudinally extending base frame 1 and a pair of longitudinally extending side wall members 2 (2A and 2B) which are mounted on the frame 1 in laterally spaced relation. The base frame and side wall members cooperate to form a channel 3 which is entirely open at its top and front end and partly open at its rear end, the lower portion of the rear end being open and the upper portion closed by suitable cross-frame members or braces. Each of the side wall members 2 is preferably divided into front and rear sections respectively designated as 2A and 2B and hereinafter termed the A and B sections.

Each front A section is rigidly secured to the base frame 1, while an axis 4 pivotally secures each rear B section, at its inner end adjacent the A section, to the frame 1. The rear or outer ends of the pivotal B sections are rigidly connected to each other by a cross member so that they may be swung as a unit angularly about their axes 4 from a horizontal position over a range of inclined positions. In this way, the base, as a whole, can be adjusted, to conform roughly or approximately, to the curvature of a proposed upwardly-curved beam, by swinging the B sections upwardly to, and holding them in, a position of appropriate inclination.

A pair of arms 5 are arranged along opposite outer sides of the base frame 1 below but not under the B sections. Each arm is pivotally secured, by an axis 6 at its rear end, to the rear end of the base frame 1 for angular movement from a horizontal position to any of a range of inclined positions. The arms 5 are arranged to be bolted to the B sections in order to hold them in positions of desired inclinations. For this purpose, the arms 5 are provided with a series of bolt holes 7, while the B sections have a corresponding series of bolt holes 8.

Jig members (9–11)

The jig members are positioned at equal intervals along channel 3. Each jig member comprises an inverted, unitary, U-shaped member having opposite vertically arranged channel iron legs 9, respectively adjacent opposite side wall members 2, and an upper horizontal bight 10, in the form of a metal I beam, the uppermost surface of which faces upwardly into the work space to function as a jig surface. The jig members are independently movable, both vertically toward and away from the work space and angularly toward and away from adjacent jig members, adjustably to any of a range of positions in which their jig surfaces cooperate with each other to form a longitudinally-extending lumber-receiving platform facing upwardly into the work space. This platform is transversely-slotted between the jig surfaces which are disconnected, that is to say not connected to each other. Each leg 9 is provided with a centrally disposed longitudinal slot 11, extending over a substantial portion of its length to accommodate lower and upper clamps by which each leg is mounted on the side wall members 2 for angular and vertical adjustment.

Jig member clamps (12–18, 19–24)

Each lower clamp (see Figs. 5–7) comprises: a metal spacer 12, positioned between a leg 9 and the adjacent side wall 2; a rectangular block 13 integrally secured to the spacer 12 and arranged to fit snugly within and against the walls of the channel of leg 9; a U-shaped plate or saddle 14, slidably fitted over the leg 9, opposite the rectangular block 13; a pivot bolt 15, rigidly mounted on the adjacent side wall and arranged to project successively thru the spacer 12, block 13, slot 11 of leg 9, and saddle 14; and a clamping nut 16 threaded to the pivot bolt 15 for pressing the assembled parts rigidly against the side wall. The lower clamps, on opposite legs of any one jig member, carry practically all the load to which the jig member is subjected and this load will be largely transferred to the frame thru the spacer 12 if it is rigidly anchored to the frame and not permitted to slip. In order to insure a rigid anchorage of the spacer 12, it is placed in anti-slip engagement with the frame by providing its frame-engaging face with an annular flange 17, which fits snugly in an annular groove 18, in the adjacent face of the frame.

Each upper clamp (see Figs. 5, 8–9) comprises: a metal spacer 19; a circular block 20 integrally secured to the spacer 19 and projecting from it partly into the channel of leg 9, this block extending completely across the width of the channel of leg 9, but being circular to permit relative rotational movement, the block and spacer having a central threaded well; a saddle 21 slidably fitted over leg 9 opposite the circular block 20; and a bolt 22 extending successively thru saddle 21 and slot 11 of leg 9 into threaded engagement with the threaded well of block 20 and spacer 19. The bolt 22 thus serves to lock the saddle, leg, block and spacer assembly together and this assembly is connected to the frame by a horizontal groove and tongue connection consisting of a groove 23 on the spacer 19 and a tongue 24 on the adjacent side wall of the frame. The tongue-providing member is rigidly mounted on the uppermost face of the adjacent side wall 2 of frame 1, and arranged to form the tongue 24 by overhanging the channel 3.

It will be appreciated that, when both lower and both upper clamps of any one jig member are loosened, such jig member may be raised and lowered relatively to such clamps and also swung angularly about both pivot bolts 15 of the lower clamps, the upper clamps moving horizontally along the tongue or guide member 24 during such angular movement. Consequently, it is a simple matter to adjust the jig members vertically and angularly to a desired position and then lock them in such position simply by tightening both lower clamp nuts 16 and both upper clamp bolts 22. While both upper and lower clamps tend to lock a jig member against any movement, the upper clamps function mainly to lock it against angular movement and the lower clamps to lock it against vertical movement. Since the load on each jig member is exerted in a vertical direction, the lower clamps carry most of this load and transfer it to frame as previously stated.

It is evident that the jigs may be adjusted to form straight or curved platforms and that the curved platforms may be of simple, compound or reverse curvature.

Template (25–26)

A template is made for each proposed beam of different curvature. This template consists preferably of a long, relatively narrow and thin piece of wood having one longitudinal edge cut to conform to the curvature sought in the proposed beam. Thus the template 25 shown in Fig. 2 has its lower edge 26 cut to a desired reverse curvature.

The jig is adjusted to a template of one curvature for the manufacture of beams of that same curvature. For example, if it be assumed that a simply curved beam, such as is indicated in Figures 3 and 4, is to be manufactured, the jig may be conditioned to receive the lumber laminations for that beam as follows: by pivotally adjusting the B sections of the frame to, and bolting them in, an appropriate inclination; by placing, over the jig members, another template (not shown) having an outside edge defining a simple curve corresponding to the simple curvature of the proposed beam; and by adjusting each jig member angularly and vertically to, and rigidly clamping it in, a position in which its jig surface is flush with the adjacent outside edge of the template. With these adjustments completed, the template is laid aside so that the laminations may be placed over, and bent to conform to the shape of the platform.

Winch (27–37)

A single lumber lamination, or several superimposed laminations, may be placed over the jig platform and bent to conform to its shape. Where the lumber laminations are sufficiently thin and flexible, they may be individually placed over the platform and manually bent to shape, one after another. Where they are too stiff for manual bending, they may be bent individually or collectively by a suitable power mechanism such as the winch apparatus shown. This apparatus comprises: a conventional winch 27 (Fig. 3) positioned at the rear end of the jig; an I beam rail 28 (Figs. 3 and 4) extending longitudinally and centrally along the bottom of the channel 3 and rigidly anchored to the base frame 1; a pulley 29 (Figs. 3 and 10) slidably anchored to the rail by an I beam jaw 30; a load distribution spring saddle 31 (Figs. 11–12) composed of a center block 32, a pair of end blocks 33 spaced from opposite ends of the center block, a leaf spring 34 unitarily connecting the blocks together; a stirrup strap 35 extending around the top of the saddle over the central block and the leaf spring and depending rigidly along opposite sides of the saddle, and a chain 36 extending from the lower end of one stirrup strap to the other and detachably connected to both; and a power line 37 extending from the winch 27 through the lower rear opening of the channel 3 and around the pulley 29 upwardly toward the spring saddle 31 and terminating in a hook which centrally engages the saddle chain 36.

With this arrangement, after all of the laminations, or that part of them which can be satisfactorily handled at any one time, are placed over the jig platform, the saddle 31 is positioned over the laminations with the center block 32, at the area of maximum bending. The chain 36 is then connected to extend underneath the lumber from one end of the stirrup 35 to the other. The I beam jaw 30 is slidably moved along rail 28 to an appropriate position, the power line 37 connected to the chain 36 and the winch 27 then operated to bend the laminations against the jig platform.

End blocking means (38–45, 46–47)

While it may be possible in some cases to bend all of the laminations, either manually or mechanically, at one time, usually it will be necessary to bend them progressively in groups embracing one or a limited number of laminations. When successive groups are superimposed successively and bent, it is desirable to block the ends of the preceding groups in order to hold them in their bent shape during the intervals between bendings, in which the succeeding groups are superimposed and bent. While the ends may be blocked in various ways, as by nailing the ends of two or more superimposed bent laminations temporarily together, the blocking means shown comprises: a bumper at one end of the laminations; and a nail block underneath the other end thereof.

The bumper simply comprises (see Fig. 3) a wooden bumper bar 38 suitably clamped to the jig surface of a suitably adjusted jig member on the B section. This jig member is adjusted and clamped by upper and lower leg clamps in the same way as other jig members. It is additionally braced at opposite sides by auxiliary braces 39, which are bolted to both the B section and the jig member legs.

The platform clamp illustrated, which is used to clamp the bumper bar 38 and which is designated as a whole by the numeral 40, is a conventional I beam jaw clamp (see Fig. 5) comprising a pair of studs 41, each anchored at its lower end to the I beam bight 10 of the jig member by an I beam jaw 42, and each threaded at its opposite end to receive a clamping nut 43. The nut 43 is connected to a cross member 44, extending from one stud to the other, to force that cross member toward the bumper bar 38, and thus press the pressure plate 45, which is pivotally carried by the cross member 44, against the bumper bar 38.

The nail block underneath the other end of the lumber laminations, simply comprises (see Fig. 3) a suitably anchored wooden block 46 positioned to engage the under side of the lumber. It may be rigidly anchored to the jig frame in any suitable manner, as by bolting it directly to the side frames 2. With the wooden nail block 46 bolted in position, the first lamination, which is bent to shape with one end against the bumper bar 38, is held in its bent shape simply by nailing its other end to the nail block 46, as indicated at 47. Succeeding groups of one or more laminations, when superimposed over preceding groups and bent to shape with one end against bumper bar 38, are similarly held in bent shape by nailing their other ends to the nailed ends of the preceding groups.

Where the lumber laminations are to be nailed at either or both ends, they should be longer than the proposed beam to permit the nailed portions to be cut off.

Guides (48–51)

Figure 13:
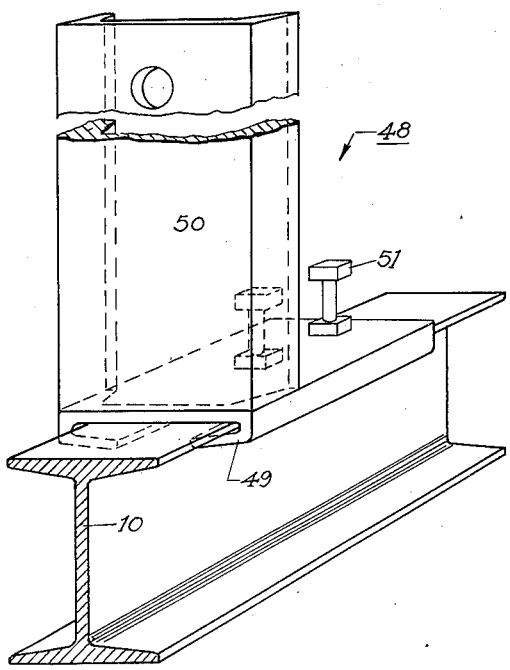
Fig. 13 is a perspective of a guide member in relation to a jig member.

During bending, the laminations, particularly where long beams are being manufactured, sometimes tend to slip edgewise from proper superimposed relationship. To prevent slippage, a pair of opposed guides 48 may be mounted on the jig members adjacent each end of the jig, as in Fig. 3. Each guide (see Fig. 13) comprises: a base in the form of a horizontally elongated I beam jaw 49; an upright channel 50 rigidly anchored to one end of the base with its outer vertical bight surface flush with the adjacent end face of the base; and a pair of bolts 51 which screw centrally downward entirely through the top surface of the base. The I beam jaws 49 of each pair of opposed guides are slipped over opposite ends of the I beam 10 of a jig member, with the outer bight surfaces of the upright channels 50 facing each other. The opposed bights of the opposed guides are spaced from each other a distance corresponding to the width of the laminations and then rigidly anchored to the jig members by screwing bolts 51 downwardly into tight engagement with the upper or jig surface of the jig member 10.

Platform clamps (40)

Figure 5:
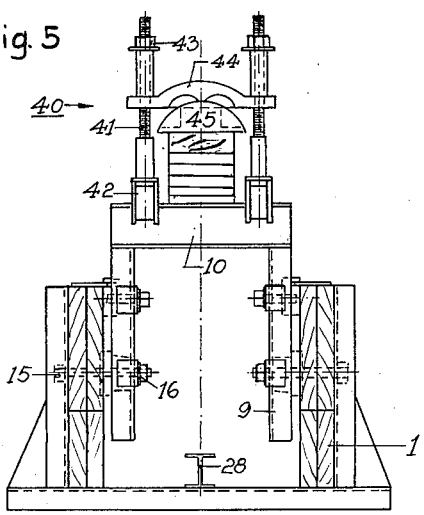
Fig. 5 is a transverse section taken thru Fig. 3 along line 5—5.

When all of the laminations have been bent to conform to the shape of the platform, they are clamped thereto by I beam jaw clamps of the conventional character above designated by the numeral 40 (see Fig. 5). Preferably one clamp 40 is provided for each adjusted jig member. Where the beam is provided with a single curve, the first clamp is positioned as close to the area of maximum bending as is possible and succeeding clamps are progressively applied from opposite sides of the first clamp outwardly toward opposite ends. Thus, in Fig. 3, the first clamp would be inserted between the center block and one of the end blocks while the spring saddle remains in position. With a reversely curved beam the first clamp preferably is secured as close as possible to the center of concave curvature of the platform. Where a nail block is used, the end portions containing the nails are sawed off after enough clamps have been applied to the beam to hold it to the platform. Normally, after placing one clamp at the center of a beam containing a single curve, the nail end portions are sawed off because, as other clamps are applied, they may be some endwise movement of the lumber laminations which the end blocks would tend to prevent.

The platform clamps serve to secure the beam rigidly to the platform and thus insure its accurate conformance to the shape of the platform. While the beam might remain on the platform during the curing period, it is desirable to remove it therefrom in order to free the jigs for other use. For this purpose, the independent clamps 52 are provided.

Independent clamps (52–57)

Figure 14:
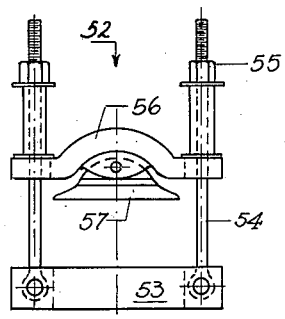
Fig. 14 is an elevation of the independent clamp.

The independent clamps are arranged to encircle the beam between the platform clamps so as to permit the platform clamps to be released and the beam, together with the independent clamps, removed to the ovens (not shown) where sufficient heat can be applied, not only to speed up the curing process, but to effect a cure at a temperature which produces a more effective bond. The independent clamps 52 (see Fig. 14) include a bottom cross member 53, a pair of studs 54, clamp nuts 55 threaded to the studs 54 and arranged, when screwed downwardly, to press the top cross bar 56 downwardly toward the lumber and thus force pressure plate 57, which is pivotally carried by the top cross bar 56, firmly against the lumber.

Upon removal, from the jig, of the beam with its independent clamps, other independent clamps are preferably placed on the beam wherever space will permit in order to maintain the laminations under effective pressure at all points along its length and thereby insure a better bond.

With the foregoing arrangement, two or more jigs may be placed in end to end relation to accommodate the longer beams.

Having described my invention I claim:

1. An adjustable jig for use in manufacturing laminated timbers comprising: a base having a horizontally-elongated section underlying a work space; a series of upright jig members, positioned at horizontally-spaced intervals along the length of said section and arranged to project upwardly therefrom toward the work space and to present at their upper ends a series of horizontal, disconnected, longitudinally-spaced, upwardly-facing timber-supporting jig surfaces extending transversely to said section, each jig member having its jig surface carried by an upright leg; means on said base to support said leg for independent movement, both vertically toward and away from the work space and angularly toward and away from adjacent jig members, and adjustable to any of a range of positions in which its jig surface cooperates with the jig surfaces of the other adjusted jig members to form a longitudinally-extending transversely-slotted, lumber-receiving platform facing upwardly into the work space; and means for securing upper and lower portions of each adjusted jig leg rigidly to the base in order to maintain said platform in a rigid condition.

2. An adjustable jig for use in manufacturing laminated timbers comprising: a base having a horizontally-elongated section underlying a work space and a series of horizontal pivot points positioned at horizontally-spaced intervals along the length of said section; a series of upright jig members, positioned along the length of said section and arranged to project upwardly from spaced pivot points toward the work space and to present at their upper ends a series of horizontal, disconnected, longitudinally-spaced upwardly-facing, timber-supporting jig surfaces extending transversely to said section, each jig member having its jig surface carried by an upright leg; means on said base to support said leg for independent movement, both vertically along its pivot point toward and away from the work space and angularly about its pivot point toward and away from adjacent jig members, and adjustable to any of a range of positions in which its jig surface cooperates with the jig surfaces of the other adjusted jig members to form a longitudinally-extending transversely-slotted lumber-receiving platform facing upwardly into the work space; and means for securing upper and lower portions of each adjusted jig leg rigidly to the base in order to maintain said platform in a rigid condition.

3. An adjustable jig for use in manufacturing laminated timbers comprising: a base having a horizontally-elongated section underlying a work space and a series of pivot points positioned at horizontally-spaced intervals along the length of said section; a series of upright jig members, positioned along the length of said section and arranged to project upwardly from said pivot points toward the work space and to present at their upper ends a series of horizontal, disconnected, longitudinally-spaced upwardly-facing jig surfaces extending transversely to said section, each jig member having its jig surface carried by an upright leg; means on said base for supporting said leg for independent movement, both vertically along its pivot point toward and away from the work space and angularly about its pivot point toward and away from adjacent jig members, and adjustable to any of a range of positions in which its jig surface cooperates with the jig surfaces of the other adjusted jig members to form a longitudinally-extending transversely-slotted, lumber-receiving platform facing upwardly into the work space, one or more of said upright jig legs being provided with a longitudinal upwardly-extending slot; and means for securing each adjusted jig leg rigidly to the base in order to maintain said platform in a rigid condition, said means including separately operable upper and lower clamping means extending through said slots for rigidly securing upper and lower portions of one or more slotted jig legs.

4. An adjustable jig for use in manufacturing laminated timbers comprising: a base having a horizontally-elongated upwardly-open channel underlying a work space, opposed side-wall frame members forming opposed sides of the channel and a series of pivotal axes passing horizontally across the channel at horizontally spaced intervals along the length thereof; a series of inverted U-shaped jig members positioned along the length of the channel and transversely arranged across the channel to project upwardly from spaced pivotal axes toward the work space with their bight ends uppermost to extend adjacent the work space, with their upper outer horizontal bight faces presenting along the work space a series of disconnected longitudinally-spaced upwardly-facing jig surfaces extending transversely to said channel and with their opposed legs extending adjacent the opposed side frame members; and means on said base for supporting each jig member for independent movement, vertically along its pivotal axis toward and away from the work space and angularly about its pivotal axis toward and away from adjacent jig members, and adjustable to any of a range of positions in which its jig surface cooperates with the jig surfaces of the other adjusted jig members to form a longitudinally-extending transversely-slotted lumber-receiving platform facing outwardly into the work space, each leg of one or more pairs of opposed legs being formed as an upwardly-extending U-shaped channel which opens horizontally toward the adjacent side frame and the bight of which contains an upwardly-extending slot; said means including separately operable upper and lower clamping means extending through said slot for rigidly securing upper and lower portions of one or more slotted jig legs to said base to maintain said platform in a rigid condition.

5. The jig of claim 4 wherein a lower clamping means for a slotted jig leg includes: a pivot bolt rigidly mounted on a side wall frame member and projecting through said slot at the axis of said leg to provide a center relatively to which the leg may be adjustably moved both vertically and angularly; and a spacer extending around the bolt between the leg and frame member, said spacer having anti-slip engagement with said frame member and being operative, when the lower clamping means is adjusted to secure the leg, to transfer a load on the leg directly to said frame member and thus protect the bolt against such load.

6. The jig of claim 4 wherein a lower clamping means for a slotted jig leg includes: a spacer positioned between said leg and the adjacent side wall frame member with one face in antislip engagement with said frame member; a block rigidly secured to the spacer and slidably fitted to the leg channel; a pivot bolt mounted on the adjacent side wall to project inwardly through the spacer, block and leg slot at the axis of said leg; and a clamping nut on the projecting inner end of the bolt.

7. The jig of claim 4 wherein the upper clamping means for a slotted jig leg includes: a clamping assembly associated with the leg; a bolt extending through the leg-slot into threaded arrangement with the assembly and arranged, when loosened, to permit the leg to be raised, lowered and rotated relatively to the assembly and, when tightened, to lock the leg and assembly rigidly together; and means providing, between the assembly and the frame, a horizontally-extending tongue and groove connection which guides the assembly horizontally along the frame when the leg is angularly moved, and which resists angular movement of the leg and assembly when the latter are clamped together.

8. The jig of claim 4 wherein the upper clamping means for a slotted jig leg includes: a spacer positioned between the leg and the adjacent side wall; a block rigidly secured to the spacer and slidably fitted to the leg channel; a threaded well in the spacer-block assembly; a bolt projecting through the leg slot into threaded engagement with said well and arranged to lock and unlock the spacer and block to and from the leg respectively when tightened and loosened; and means providing between the spacer and the frame, a horizontally-extending tongue and groove connection which guides the assembly horizontally along the frame when the leg is angularly moved, and which resists angular movement of the leg and assembly when the latter are clamped together.

9. An adjustable jig for use in manufacturing laminated timbers comprising: a base having an elongated channel opening outwardly toward a work space and opposed side wall frame members forming opposed sides of the channel; a series of U-shaped jig members positioned at spaced intervals along the length of the channel and transversely arranged across the channel to project outwardly therefrom toward the work space with their bight ends outermost to extend adjacent the work space, with their outer bight faces presenting along the work space a series of disconnected, longitudinally-spaced outwardly-facing jig surfaces extending transversely to said channel and with their opposed legs extending adjacent the opposed side frame members; means on said base to support each jig member for independent movement, outwardly toward and inwardly away from the work space and angularly toward and away from adjacent jig members, and adjustable to any of a range of positions in which its jig surface cooperates with the jig surfaces of the other adjusted jig members to form a longitudinally-extending transversely-slotted lumber-receiving platform facing outwardly into the work space; and means for securing upper and lower portions of each adjusted jig leg rigidly to the side wall frame members in order to maintain said platform in a rigid condition.

10. The jig of claim 9 wherein: the base has a series of axes passing across the channel at spaced intervals along its length; and the jig members project outwardly from such axes, said jig supporting means being arranged to support each jig member for movement longitudinally along and angularly about one of said axes.

11. An adjustable jig for use in manufacturing laminated timbers, comprising: a base having horizontally-arranged, longitudinally-extending side wall frame members laterally-spaced in opposed relationship with the interposed space between members underlying a work space, each side wall frame member including two horizontally-arranged, longitudinally sections with their inner ends in end-to-end relationship, means pivotally mounting the inner end of one section for angular movement, relative to the other section, from a horizontal position to any of a series of inclined positions wherein both sections cooperate to form a desired angle, and means for rigidly holding the inclined section in its inclined position; a series of inverted U-shaped jig members positioned at spaced intervals along the length of said interposed space and transversely arranged across said space to project upwardly therefrom toward the work space with their bight ends uppermost to extend adjacent the work space, with their uppermost bight faces presenting along the work space a series of disconnected, longitudinally-spaced, upwardly-facing jig surfaces extending transversely to said interposed space and with their opposed legs extending into the interposed space adjacent said opposed side frame members; means on said base to support each jig member for independent movement, both vertically toward and away from the work space and angularly toward and away from adjacent jig members and adjustable to any of a range of positions in which its jig surface cooperates with the jig surfaces of the other adjusted jig members to form a longitudinally-extending, transversely-slotted, lumber-receiving platform facing upwardly into the work space; and means for securing each adjusted jig leg rigidly to said side wall frame members to maintain said platform in a rigid condition.

12. An adjustable jig for use in manufacturing laminated timbers, comprising; a base having horizontally-arranged longitudinally-extending side wall frame members laterally-spaced in opposed relationship with the interposed space between members underlying a work space; a series of jig members positioned at spaced intervals along the length of said interposed space and transversely arranged across such space to project upwardly therefrom toward the work space with their uppermost faces presenting along the work space a series of disconnected, longitudinally-spaced, upwardly-facing jig surfaces extending transversely to said interposed space, each jig having opposed guide members removably secured thereto along opposite end portions of its jig surface to extend upwardly therefrom and cooperating with said surface to form an upwardly-open, lumber-receiving guide channel; means on said base to support each jig member for independent movement, both vertically toward and away from the work space and angularly toward and away from adjacent jig members, and adjustable to any of a range of positions in which its jig surface cooperates with the jig surfaces of the other adjusted jig members to form a longitudinally-extending, transversely-slotted, lumber-receiving platform facing upwardly into the work space; and means for securing each adjusted jig leg rigidly to the side wall frame members to maintain said platform in a rigid condition.

13. An adjustable jig for use in manufacturing laminated timbers, comprising: a base having horizontally-arranged, longitudinally-extending side wall frame members laterally spaced in opposed relationship with the interposed space between members underlying a work space; a series of inverted U-shaped jig members positioned at spaced intervals along the length of said interposed space and transversely arranged across said space to project upwardly therefrom toward the work space, with their bight ends uppermost to extend adjacent the work space, with their uppermost bight faces presenting along the work space a series of disconnected, longitudinally-spaced, upwardly-facing jig surfaces extending transversely to said interposed space and with their opposed legs extending into the interposed space adjacent opposed side frame members; means on said base to support each jig member for independent movement both vertically toward and away from the work space and angularly toward and away from adjacent jig members and adjustable to any of a range of positions in which its jig surface cooperates with the jig surfaces of the other adjusted jig members to form a longitudinally-extending, transversely-slotted, lumber-receiving platform facing upwardly into the work space; means for securing each adjusted jig leg rigidly to the side wall frame members to maintain said platform in a rigid condition; and a series of platform clamps on said jig members for clamping, to adjusted jig members, lumber laminations which have been placed over and bent to the shape of the platform formed by the adjusted jig members.

14. An adjustable jig for use in manufacturing laminated timbers, comprising: a base having a horizontally-elongated section underlying a work space and a series of pivot points positioned at horizontally-spaced intervals along the length of said section; a series of upright jig members; and means to support said jig members along the length of said section in a manner to project upwardly from said base towards the work space and to present at their upper ends a series of substantially horizontal, disconnected, longitudinally-spaced, upwardly facing jig surfaces extending transversely to said section, said supporting means for each jig member including an upright, longitudinally-slotted leg, a pivot at one of said pivot points on said base for supporting said leg, and separately operable upper and lower clamping means in engagement with said leg slot for rigidly securing spaced portions of said leg to said base whereby each jig member is independently movable, both vertically along said pivot toward and away from said work space, and angularly about said pivot toward and away from adjacent jig members, and adjustable to any of a range of positions in which its jig surface cooperates with the jig surfaces of the other adjusted jig members to form a longitudinally-extending, transversely-slotted, lumber-receiving platform facing upwardly into the work space, said lower clamping means including a pivot bolt rigidly mounted on said base and projecting horizontally through said slot at the pivot point of said leg to provide a center relatively to which the leg may be adjusted vertically and angularly.

15. An adjustable jig for use in manufacturing laminated timbers, comprising: a base having a horizontally-elongated section underlying a work space and a series of pivot points positioned at horizontally-spaced intervals along the length of said section; a series of upright jig members; and means to support said jig members along the length of said section in a manner to project upwardly from said base towards the work space and to present at their upper ends a series of substantially horizontal, disconnected, longitudinally-spaced, upwardly facing jig surfaces extending transversely to said section, said supporting means for each jig member including an upright, longitudinally-slotted leg, a pivot at one of the pivot points on said base for supporting said leg, and separately operable upper and lower clamping means in engagement with said leg slot for rigidly securing spaced portions of said leg to said base whereby each jig member is independently movable, both vertically along said pivot toward and away from said work space, and angularly about said pivot toward and away from adjacent jig members, and adjustable to any of a range of positions in which its jig surface cooperates with the jig surfaces of the other adjusted jig members to form a longitudinally-extending, transversely-slotted, lumber-receiving platform facing upwardly into the work space, said lower clamping means including a pivot bolt rigidly mounted on said base and projecting horizontally through said slot at the pivot point of said leg to provide a center relative to which the leg can be adjusted both vertically and angularly, and a spacer extending around the bolt between said leg and said base, said spacer having anti-slip engagement with the base and being operative, when the lower clamping means is adjusted to secure the leg, to transfer a load on said leg directly to said base and thus protect the bolt against such load.

16. An adjustable jig for use in manufacturing laminated timbers, comprising: a base having a horizontally-elongated section underlying a work space and a series of pivot points positioned at horizontally-spaced intervals along the length of said section; a series of upright jig members; and means to support said jig members along the length of said section in a manner to project upwardly from said base towards the work space and to present at their upper ends a series of substantially horizontal, disconnected, longitudinally-spaced, upwardly facing jig surfaces extending transversely to said section, said supporting means for each jig member including an upright, longitudinally-slotted leg, a pivot at one of the pivot points on said base for supporting said leg, and separately operable upper and lower clamping means in engagement with said leg slot for rigidly securing spaced portions of said leg to said base whereby each jig member is independently movable, both vertically along said pivot toward and away from said work space, and angularly about said pivot toward and away from adjacent jig members, and adjustable to any of a range of positions in which its jig surface cooperates with the jig surfaces of the other adjusted jig members to form a longitudinally-extending, transversely-slotted, lumber-receiving platform facing upwardly into the work space, said upper clamping means including a clamping assembly associated with said leg, a bolt extending through said leg slot into threaded engagement with said assembly and arranged, when loosened, to permit the leg to be adjustably moved both vertically and angularly relative to said assembly and, when tightened, to lock the leg and assembly rigidly together; and means providing, between the assembly and the base a horizontally-extending tongue and groove connection which guides the assembly horizontally along the base when the leg is angularly moved, and which resists angular movement of the leg and assembly when the latter are clamped together.

CORNELIUS D. DOSKER.

REFERENCES CITED

The following references are of record in the file of this patent:

UNITED STATES PATENTS

| Number | Name | Date |
| --- | --- | --- |
| 229,198 | Steinway | June 22, 1880 |
| 333,615 | Dower | Jan. 5, 1886 |
| 337,113 | Bailey | Mar. 2, 1886 |
| 425,736 | Bond | Apr. 15, 1890 |
| 927,975 | Kaufman et al. | July 13, 1909 |
| 1,079,163 | Carroll | Nov. 18, 1913 |
| 1,133,174 | Orm | Mar. 23, 1915 |
| 1,465,152 | Williams | Aug. 14, 1923 |
| 1,561,613 | McKeown | Nov. 17, 1925 |
| 1,757,779 | Navratil | May 6, 1930 |
| 1,862,414 | McAlister | June 7, 1932 |
| 2,303,003 | Rumsey | Nov. 24, 1942 |